July 30, 1946.　　　　　G. A. DALIN　　　　　2,405,019
PROCESS OF MAKING ORGANO-SILICON COMPOUNDS CONTAINING A C-SI BOND
Filed Oct. 5, 1943
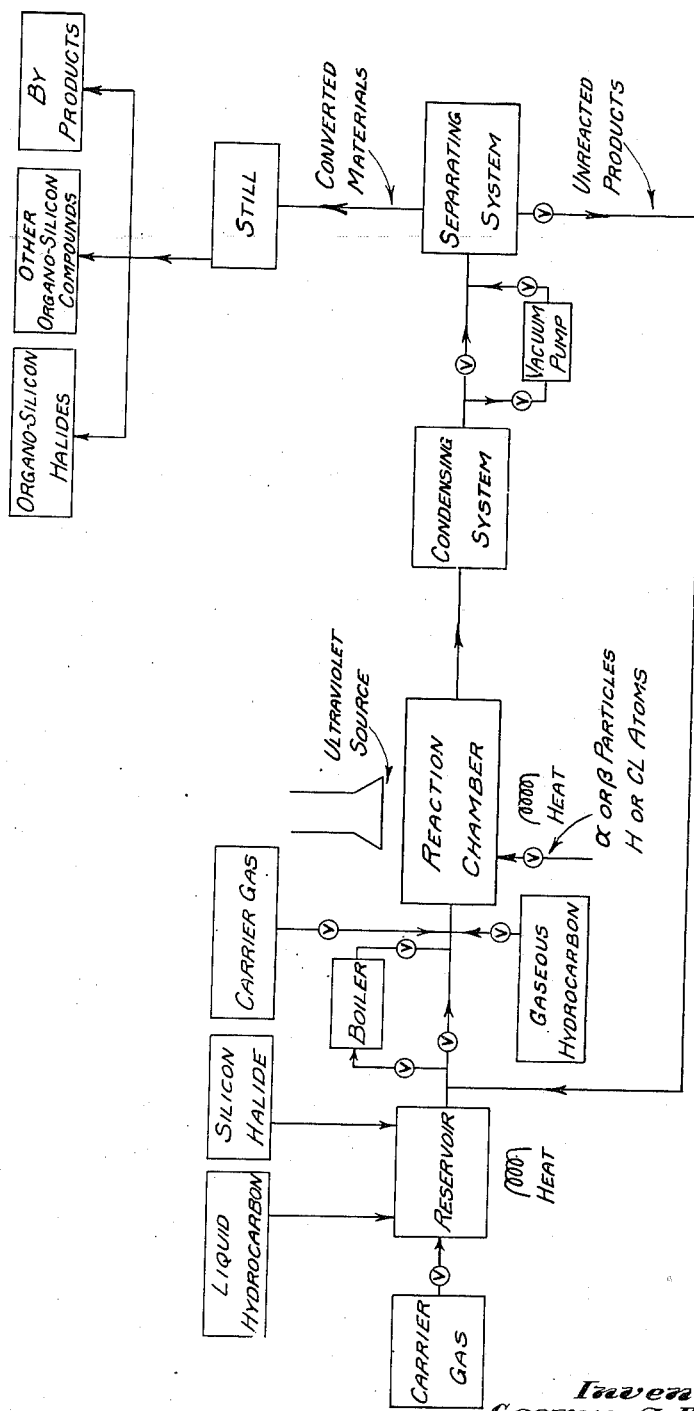

UNITED STATES PATENT OFFICE 2,405,019

PROCESS OF MAKING ORGANO-SILICON COMPOUNDS CONTAINING A C-Si BOND

George A. Dalin, Hartford, Conn., assignor to Plax Corporation, Hartford, Conn., a corporation of Delaware Application October 5, 1943, Serial No. 505,084

5 Claims. (Cl. 260—607)

This invention relates to the synthesis of organo-silicon compounds containing a C-Si bond. It has particular relation to organic substituted silicon halides, that is, silicon halides in which from one to three halide atoms are replaced by a corresponding number of organic radicals or groups and having the general form

$$R_{4-a}SiX_a$$

where R is an organic radical or group, a carbon atom of which is bonded directly to Si, X is a halide bonded to Si, and $a = 1$ to 3.

Such compounds are useful as intermediates for the synthesis of various products, such as silicon resins, and in making heat transfer liquids impregnants, adhesives, coatings, insulation materials and lubricants.

The general object is to provide a novel process of making such compounds more cheaply, and efficiently, and safely than they can be made by prior processes.

Heretofore these compounds have been made principally by the well-known Grignard reaction. In this reaction, organo-magnesium halides in ether solution must first be prepared, which are subsequently added to silicon tetrachloride. Very careful control of the temperature and reaction velocity is required. Several filtrations must be carried out under conditions requiring the exclusion of $O_2$, $CO_2$ and $H_2O$, followed by vacuum distillation of the complex mixture of reaction products.

The principal disadvantages in this process when carried out on a commercial scale are:

1. Relatively high cost of the alkyl and aryl halides.
2. Difficulties and dangers in handling the large quantities of extremely reactive, corrosive and inflammable materials.

The Grignard reaction also is undesirable as the basis of a commercial process because it can be run only as a batch process.

I have discovered that if suitable hydrocarbons and silicon halides are passed in the vapor phase through a zone wherein they are activated, the synthesis of organo-silicon compounds, in which carbon is bonded directly to silicon, occurs. This activation consists in imparting energy as rotational, vibrational, electronic or translational energy to one or more of the reactants, and thus increasing the concentration of reactive molecules.

If sufficient energy is imparted, dissociation takes place, with the formation of free radicals in the vapor phase. These fragments are so reactive that they can exist for only very short periods of time, and, in fact, probably react at every collision.

Activation can be effected in various ways, such as by the use of high temperature, electrical discharge, in the presence of one or more of the reactants, ultra-violet light, and by the introduction of rapidly moving particles, such as alpha and beta particles, and hydrogen and chlorine atoms.

I have also found that the rate of reaction can be increased by the use of suitable catalysts in the reaction zone. Examples of catalysts are silver, iron, copper in the form of metals or oxides adsorbed in activated carbon.

A preferred form of the invention comprises activating vapors of a hydrocarbon and of a silicon halide by means of thermal energy. To accomplish this the vapors may be passed through a suitably heated furnace such as an electrically heated quartz tube. To increase the total conversion, the unreacted portion of the materials may be recirculated. The vapors may be suitably replenished with the reactants in order to keep the composition of the reaction mixture constant. The condensate may then be subjected to fractional distillation to separate the organo-silicon reaction products.

If an evaporative process is used, the concentrations of the reactants are selected to give the proper ratio thereof in the vapor phase with due allowance for differences in vapor pressure. The rate of flow of the reactants, the pressure in the apparatus and the temperature of the hot tube or furnace, as well as the composition of the reaction mixture, are controlled to regulate or influence the reaction. The reaction can be carried out at reduced pressure in which case air should be removed and prevented from entering the apparatus. The reaction zone may be heated to a temperature of approximately 840° C. to 1060° C. or higher. Lower temperatures may be used when a catalyst is employed.

In order to conduct the reactants through the apparatus and to insure that air and oxygen will be excluded, I prefer to use an inert carrier gas for the reactants. Nitrogen is suitable for this purpose. The carrier gas should be freed of oxygen and moisture by passing it through a suitable purifying and drying train before admitting it to the apparatus. The apparatus should be prepared before starting operations by passing the carrier gas alone or with reactants therethrough. This may best be done before the reaction chamber is heated up. All joints and connections must be air-tight and so constructed that the reactants will not be contaminated by foreign matter such as lubricants.

I have employed three principal methods to pass the reactants through the reaction system. Figure 1 shows schematically, the sequence of operations involved in any of these methods, provisions for variation in these operations being indicated.

Method No. 1.—Vacuum transfer

The raw materials, if liquid, are placed in the reservoir, or reservoirs, which may be heated. The pump is connected into the line and started up, evacuating the system back to the reservoir. The contents of the reservoir are permitted to evaporate and to pass (with or without preheating) into the reaction chamber, through the condensing system and into the separating system. Suitable arrangements can be made for keeping the composition of the liquid in the reservoir such that, according to well-known principles of evaporation, the composition of the vapor will be that desired.

Method No. 1-A

In order to increase the rate of evaporation and, if desired, to dilute the reactants, a carrier gas is passed through the contents of the reservoir, thus becoming laden with the vapors of the reactants.

Method No. 2.—Carrier gas

An inert carrier gas, such as nitrogen, is passed through the reservoir. The system may be maintained at any pressure from atmospheric up to that at which the carrier gas is supplied. The use of a vacuum pump is not required.

Method No. 3.—Flash boiler

The reactants are pumped into a flash boiler, and being given no opportunity to condense before reaching the reaction zone must pass through it in the vapor phase.

Method No. 3-A.—Flash boiler with carrier gas

The flash boiler method may be used in combination with a carrier gas.

In the event that the hydrocarbon is a gas, it may be admitted to the reaction chamber, with or without preheating.

The drawing indicates provision for irradiating the chamber with ultra-violet light, heating the chamber, and for the admission of various excited particles which may be used separately or in combination.

Although the drawing indicates apparatus for practicing all of the methods described above, it will be understood that variations and changes may be made in the apparatus indicated in the drawing without departing from the invention.

The conversion may be increased by connecting a separating system (scrubbing towers, still, etc.) between the discharge end of the reaction chamber and its inlet end so that unreacted vapors or gas may be separated from the end products and passed again through the zone of reaction. The converted materials may be drawn out of the separating system and fractionated.

The hydrocarbon to be used is selected according to the organic radical or radicals to be substituted for the halide atoms of the silicon tetrahalide. To effect aryl substitution an aryl compound is used. Thus benzene may be used to effect phenyl substitution. Other examples of aryl compounds are naphthalene, anthracene, fluorene, phenanthrene, indene and diphenyl. Aralkyl compounds may also be used. Thus, toluene may effect both phenyl and methyl substitution to form a mixed compound, such as phenyl methyl silicon dihalide. The release of methyl groups from aromatic compounds typified by toluene may be facilitated by the presence of chlorine in the ortho or para positions. An example of such compounds is ortho-, or parachlorotoluene.

Hydrocarbons containing tertiary carbon atoms may be used in carrying out my invention to take advantage of the high degree of reactivity of hydrogen atoms bonded to such carbon atoms. Examples of such hydrocarbons are isobutane and cymene.

To form methyl silicon halides, methane and ethane as well as other volatile paraffin hydrocarbons may be used, particularly highly branched hydrocarbons which have more methyl groups. Methane, for example, dissociates to form methyl groups and hydrogen atoms. Each ethane molecule dissociates into two methyl groups. Methane or ethane may also be used to form mixed compounds. Thus, the silicon tetrahalide first may be reacted with methane and then with benzene to form phenyl methyl silicon halide or these reactions may be carried out simultaneously to obtain the same product.

The preferred silicon tetrahalide employed as a reactant is silicon tetrachloride. Benzene is preferred to form phenyl substituted silicon compounds.

Also, it is preferred to use a hot tube as the means for activating the reactants.

In forming aryl-silicon compounds from benzene and silicon tetrahalide according to my novel process valuable by-products, such as diphenyl, also may be formed. The amount of diphenyl formed may be increased by increasing the ratio of benzene to silicon tetrahalide in the reactant mixture.

Example I 250 ml. of a solution containing silicon tetrachloride and benzene in the proportions of 100 to 130 parts by weight was placed in an evaporator having air-tight connection with an electrically heated quartz tube. The tube was heated to 840° C. and nitrogen passed through the solution at the rate of about ½ liter per minute in accordance with Method No. 2 described above. The system was maintained at atmospheric pressure. In about 6½ hours all the solution was evaporated and passed through the tube. The reaction products were collected in a dry-ice trap and then distilled up to 85° C. at atmospheric pressure. The residue was distilled at a pressure of approximately 19 m. m. and fractions were collected as follows: 110–130° C., 30% of distillate collected; 130–140°, 10% of distillate collected; 140–170° C., 30% collected; and 170–175° C., 30% was collected. The distillation range of this last fraction at the pressure indicated corresponds closely to that of diphenylsilicondichloride. The following is a comparison of an analysis of this fraction with the calculated composition of diphenylsilicondichloride.

|   | Fraction at 170–175° C. | Diphenylsilicondichloride calculated |
|---|---|---|
|   | Percent | Percent |
| H | 3.55 | 3.97 |
| Cl | 28.32 | 28.0 |
| Si | 11.46 | 11.09 |
| C | 56.74 | 56.9 |
| Totals | 100.07 | 99.96 |

Example II 43.7 grams of silicon tetrachloride and 56.3 grams of benzene (which evaporates to give a ratio of approximately 1:1 in mols in the vapor phase) were placed in an evaporator and connected to a reservoir containing 68.5 grams of silicon tetrachloride and 31.5 grams of benzene for replacement of the evaporated reactants. Using the technique of Method No. 1, the reactants were evaporated and passed through the quartz tube at 850° C., at a pressure of approximately 50 mm. The reaction products were condensed and distilled up to 88° C. at atmospheric pressure to remove traces of silicon tetrachloride and nearly all the benzene. The residue solidified on cooling and was identified as a mixture of aryl substituted silicon halides and diphenyl.

Example III

The procedure of Example II was repeated at a pressure of 45 to 55 mm. which was found to be the optimum range for fog formation in the hot tube. The temperature of the tube was 960° C. The fog was white at 45 mm. and brown at 55 mm. The optimum pressure varied considerably depending upon the stage of reaction. After evaporating and passing about 250 ml. of solution through the tube, the collected condensate was distilled up to 85° C. Following this, three fractions were collected at a pressure of 45 mm.: A at 240°-260° C.; B at 260°-360° C.; and C at 360°-480° C. (all temperatures uncorrected). Quantitative analysis of fraction C verified the presence of phenyl substituted silicon chloride compounds and by-products, such as diphenyl.

Example IV 90 ml. of benzene and 90 ml. of silicon tetrachloride were evaporated and the vapor mixture passed by evaporation through the hot tube once at 980° C. The condensate was distilled to remove silicon tetrachloride and 20 ml. of toluene added and removed by distillation leaving a residue which solidified. Quantitative analysis showed that the main product was triphenylsiliconmonochloride.

Example V 850 ml. of $SiCl_4$ and 5¼ cubic feet of methane were passed through a stainless steel tube at 960° C. in 63 minutes, in accordance with Method No. 3A.

The tube was packed with a catalyst prepared as follows:

A ten per cent solution of ferric ammonium alum was prepared. Activated carbon in 4 mesh granular form was soaked in this solution and ammonia was added until strongly basic. The carbon was washed by decantation until the wash water was neutral. The catalyst was dried at 110° C. for 16 hours and charged into the reaction tube. In bringing the tube to 960° C., a small amount of water was evolved and removed.

The products of the reaction were absorbed in xylene and fractionated. A fraction distilling between 61° and 69° C. was collected and analyzed. It proved to be fairly pure methylsilicontrichloride.

Example VI 700 ml. of $SiCl_4$ and approximately 8 cubic feet of ethane were passed through a stainless steel tube at 1030° C. in 49 minutes, using Method No. 3A. The tube was packed with a catalyst similar to that in Example V. The products were collected in brine-cooled xylene.

Fractional distillation yielded a fraction, boiling between 32.4° C. and 56.0° C., and a second fraction boiling between 65.3° C. and 75.0° C., as well as unchanged silicon tetrachloride.

The first fraction appeared to consist of tetramethyl-silicane, trimethylsiliconmonochloride and silicon tetrachloride. The higher boiling fraction on analysis proved to be a mixture of methylsilicon trichloride and dimethylsilicondichloride.

From the foregoing it will be seen that I have provided a novel process whereby organo-silicon compounds may easily and continuously be produced from raw materials which are plentiful and of low cost.

Having thus described my invention, what I desire to claim and secure by Letters Patent is:

1. A process for the preparation of organo-silicon compounds which comprises reacting an inorganic silicon halide with a hydrocarbon while both reactants are in the vapor phase at a temperature of not less than approximately 840° C., condensing the reaction products, and separating organic substituted silicon halide from such reaction products.

2. A process for the preparation of organo-silicon compounds which comprises reacting an inorganic silicon halide with a hydrocarbon while both reactants are in the vapor phase at a temperature of from 840° C. to 1060° C., condensing the reaction products, and separating organic substituted silicon halide from such reaction products.

3. A process for the preparation of organo-silicon compounds which comprises reacting an inorganic silicon halide with a hydrocarbon containing a tertiary carbon atom while both reactants are in the vapor phase at a temperature of from 840° C. to 1060° C., condensing the reaction products, and separating organic substituted silicon halide from such reaction products.

4. A process for the preparation of organo-silicon compounds which comprises reacting an inorganic silicon halide with an aromatic hydrocarbon while both reactants are in the vapor phase at a temperature of not less than approximately 840° C., condensing the reaction products, and separating organic substituted silicon halide from the reaction products.

5. A process for the preparation of organo-silicon compounds which comprises reacting silicon tetrachloride with benzene while both reactants are in the vapor phase at a temperature of from 840° C. to 1060° C., and separating the organo-silicon products resulting from the reaction.

GEORGE A. DALIN.